US008619838B2

(12) United States Patent
Hao et al.

(10) Patent No.: US 8,619,838 B2
(45) Date of Patent: Dec. 31, 2013

(54) IN LINE SIGNAL REPEATERS FOR TRANSMISSION LINE BASED ELECTRIC FENCES

(76) Inventors: Jin Hao, San Diego, CA (US); Xuekang Shan, San Diego, CA (US)

(*) Notice: Subject to any disclaimer, the term of this patent is extended or adjusted under 35 U.S.C. 154(b) by 404 days.

(21) Appl. No.: 13/041,381

(22) Filed: Mar. 5, 2011

(65) Prior Publication Data
US 2012/0223282 A1    Sep. 6, 2012

(51) Int. Cl.
*H04B 3/36*    (2006.01)
(52) U.S. Cl.
USPC ............................. 375/211; 330/252; 256/10
(58) Field of Classification Search
USPC ............................. 330/252–261, 295, 124 R
See application file for complete search history.

(56) References Cited

U.S. PATENT DOCUMENTS 5,801,549 A * 9/1998 Cao et al. ........................ 326/83

* cited by examiner

Primary Examiner — Hieu Nguyen

(57) ABSTRACT

An electric repeater for use in transmission line based electric fences. The electric repeater comprises a forward amplifier, a backward amplifier, a quad pole quad throw signal switch, and a monostable circuit. The short forward electric pulse in the transmission line is amplified by the forward amplifier, and the amplified electric pulse trigger the monostable circuit. The monostable circuit then outputs a n electric pulse with predetermined width. This electric pulse operates the quad pole quad throw signal switch such that the wire pair of the transmission line is connected to the backward amplifier and disconnected from the forward amplifier as soon as the forward electric pulse has passed through the forward amplifier. DC electric power is supplied to the forward amplifier and backward amplifier by the transmission line metal wire pair, and two pairs of capacitors are used to block this DC electric power from entering the input and output of the forward and backward amplifiers. A low pass filter is inserted in each of the transmission line metal wires so that short electric pulse is forced to go through the forward and backward amplifiers while DC electric power may flow through these low pass filters to power repeaters further down the transmission line. A section of the transmission line immediately after the repeater is hidden in the supporting post to eliminate the dead zone in the transmission line based electric fence.

5 Claims, 2 Drawing Sheets

IN LINE SIGNAL REPEATERS FOR TRANSMISSION LINE BASED ELECTRIC FENCES

BACKGROUND FOR THE INVENTION

A recently filed patent (Ser. No. 12/954,704) described a new type of electric fence: transmission line based electric fence. This type of fence has a distinctive advantage over conventional fences: it can locate an intrusion.

Since transmission lines have attenuation, the working distance of this type of electric fences has a limited range. To extend the working distance range, electric signal repeaters are highly desirable. The basic functionality of an electric repeater is to amplify electric signal, and particularly, short electric pulses in transmission line based electric fences. Due to the nature of this type of electric fences, the repeater needs to amplify signals traveling in both directions without introducing interference between the signals in opposite directions.

It is common practice to design and build amplifiers for amplifying signals in one direction. It is difficult, however, to design an amplifier that can amplify signals in opposite directions.

SUMMARY OF THE INVENTION

This invention describes bi-directional repeaters to be used as in-line repeaters for the transmission line based electric fence to increase its working distance. A forward amplifier amplifies the forward propagating short pulse and launches the amplified pulse further down the transmission line. This amplified pulse also triggers a monostable circuit with a pre-determined time delay to operate a quad pole double throw signal switch such that the transmission line is disconnected with the forward amplifier and is connected to the backward amplifier. If there is an intrusion further down the transmission line that causes a reflection of the short pulse, the reflected signal is amplified by the backward amplifier and propagates towards the fence terminal equipment.

DETAILED DESCRIPTION OF THE PREFERRED EMBODIMENT

Figure 1:
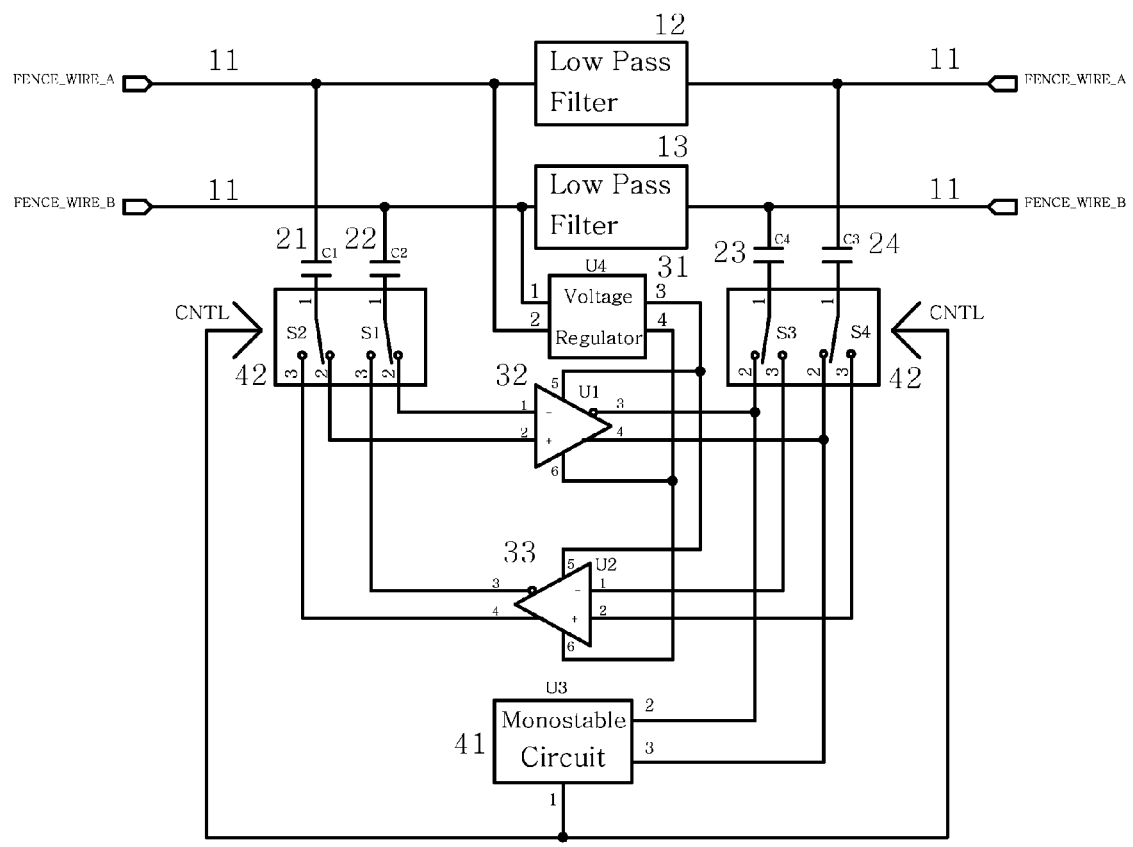
FIG. 1 shows the block diagram of the in line signal repeater.

As is shown in FIG. 1, the repeater comprises forward amplifier 32, backward amplifier 33, quad pole double throw signal switch 42, monostable circuit 41, voltage regulator 31, DC blocking capacitors 21, 22, 23, and 24, low pass filters 12 and 13. The short electric pulse propagating alone the transmission line based electric fence reaches the forward amplifier via the signal switch 42, which stays at position 2 when no control signal is applied. The amplified pulse triggers the monostable circuit which generates an electric pulse with predetermined width. The rising edge of this electric pulse moves the signal switch to position 3 so that the switch disconnects both the input and output of the forward amplifier from the transmission line, and connects the backward amplifier to the transmission line. In this status, if there is an intrusion beyond the repeater, the reflected signal is amplified by the backward amplifier and further propagates towards the fence terminal equipment. Therefore, both the forward and reflected pulse is amplified and the working distance of the electric fence is increased.

Figure 2:
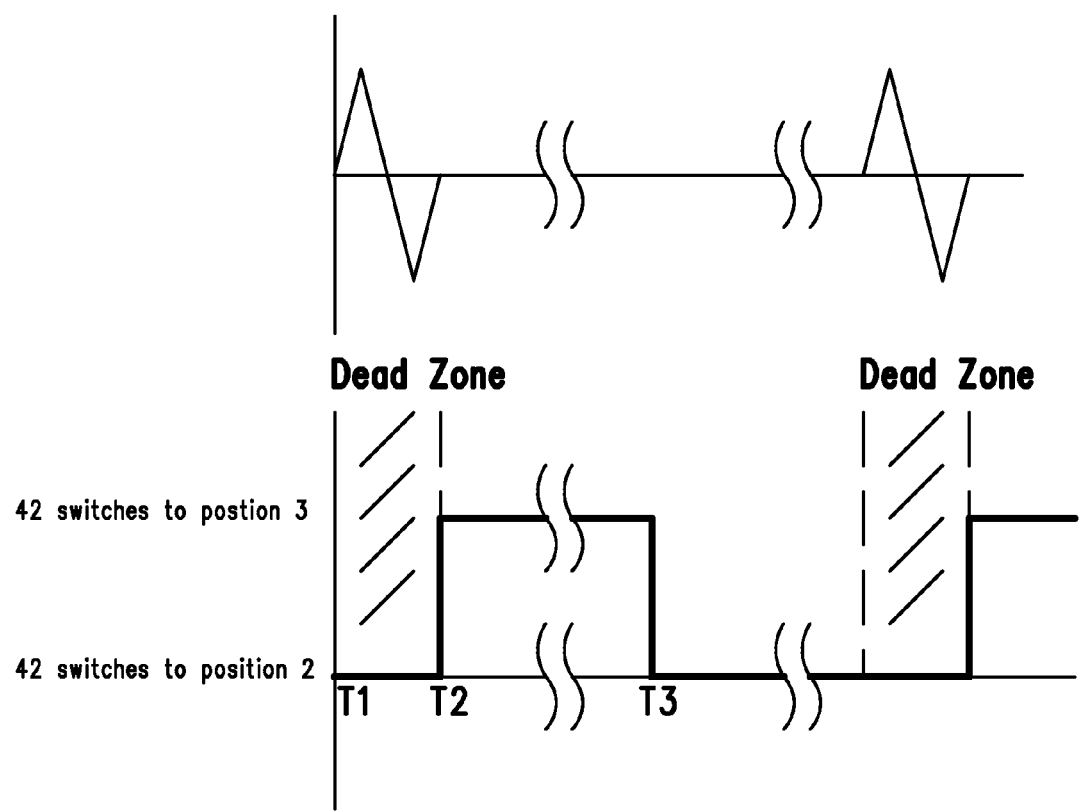
FIG. 2 shows the timing sequence of switching the signal switch.

However, any monostable circuits, and any signal switches, no matter how fast they are, have delays. In this embodiment, the consequence of these delays is that there will be a dead zone immediately after the repeater, in which an intrusion will not lead to a reflected signal propagating towards the fence terminal equipment, as is shown in FIG. 2. This problem is solved by hiding the dead zone transmission line wire pair in the repeater supporting post, such that this dead zone is not visible and touchable from outside.

It is highly desirable that the wire pair of the electric fence is used to supply electric power to the repeater. This is realized by using capacitors to block DC to the input and output of the forward and backward amplifiers while supplying DC voltage to them, as is shown in FIG. 1. In the case there are multiple repeaters in the electric fence, the fence wire pair can also supply DC electric power to each of the repeaters. This is realized by inserting low pass filters 12 and 13 in the transmission line wire pair, which have low resistance to DC currents while exhibiting high impedance to short electric pulses used by the electric fences. As is shown in FIG. 1. In this way, multiple repeaters can be powered by the same wire pair.

The forward amplifier and backward amplifier:

As is shown in FIG. 1, both the forward amplifier 32 and backward amplifier 33 are Operational Amplifiers combined with a Transistor Power Booster. The operational amplifier is used as a differential amplifier with a differential output. For example: a Class B or Class AB power booster stage, comprising PNP and NPN transistors, further boost the output of the differential amplifier.

The Voltage Regulator for the repeater:

As is shown in FIG. 1, DC Voltage Regulator 31 is used for the repeaters. The metal wire pair supplies a DC voltage. For example: 12V DC to the repeaters.

Signal Switching

Repeaters for transmission line based electric fences differ from ordinary communications transmission line repeaters in that they need to amplify signals in both directions, because the electric fence terminal equipment launches a short pulse into the transmission line then receives the reflected pulse. Apparently, one can not simply use two parallel and opposite amplifiers for this purpose, because this arrangement makes positive feedback and both amplifiers will quickly run into saturation.

In order to amplify signal in the forward direction first, and then in the backward direction, signal switches are used, as is shown in FIG. 1. A quad pole double throw switch 42 is used. The switch is arranged such that when there is no signal on the transmission line, the forward amplifier is always connected to the transmission line wire pair. Therefore the forward amplifier is waiting for the signal to come. When the signal reaches the forward amplifier, the signal is amplified and continue to propagate down the transmission line. In the mean time, the output voltage of the forward amplifier triggers the switch control circuits, which generate a delay. After this delay, the control circuits move the two switches to the position that the forward amplifier is disconnected from the transmission line wires and the backward amplifier is connected. At this switch position, the reflected signal (if there is an intrusion further down the fence line) is amplified by the backward amplifier and propagate towards the terminal equipment.

Dead Zone:

Since the transmission line wire pair can only connected to the output of the forward amplifier or the input of the backward amplifier, but not the two at the same time, a one by two signal switch is needed for switching the line wire pair between the two, as is shown in FIG. 2. Such signal switches inevitably have delays, normally in the range of a few nano seconds to ten nano seconds. This delay means a dead zone on the transmission line immediately after the forward amplifier, because if there is an intrusion within a few meters after the forward amplifier, the backward amplifier will not see the reflected signal pulse, due to the delay in signal switching. The faster the switching is, the smaller the dead zone. In our embodiment of the signal repeater, we hide the dead zone wire length in the transmission line supporting post such that intruders will not be able to touch this part of the wires.

Repeater Spacing and Amplifier Gain

The Repeater Spacing and the gain of the repeater amplifiers have to be properly chosen. The higher the gain, the higher line loss that can be tolerated, and thus the longer repeater spacing and lower system cost. However, on the other hand, higher line loss means weaker signal and thus poorer signal to noise ratio.

What is to claim is:

1. A bi-directional repeater for transmission line based electric fences comprising:
   a. a forward amplifier with differential input and output, for amplifying forward signal;
   b. a backward amplifier with differential input and output, for amplifying backward signal;
   c. a monostable circuit that is triggered by the output of said forward amplifier and outputs an electric pulse with a predetermined pulse width;
   d. a quad pole double throw signal switch that connects the transmission line wire pair to the forward amplifier in normal state, and to said backward amplifier when triggered by said output electric pulse of said forward amplifier;
   e. said output pulse of said monostable circuit operates said quad pole double throw signal switch such that said quad pole double throw signal switch connects said transmission line to said backward amplifier for a time period equal to said predetermined pulse width;
   f. after said time period equal to said predetermined pulse width, said quad pole double throw signal switch reconnects said transmission line wire pair to said forward amplifier, waiting for next short pulse to come.

2. A bi-directional repeater for transmission line based electric fences as in claim 1, wherein a transmission line based electric fence that comprises a pair of metal wires supplies electric power to said bi-directional repeater, and DC electric power for said two amplifiers is supplied via said transmission line that comprises a metal wire pair.

3. A bi-directional repeater for transmission line based electric fences as in claim 1, wherein two pairs of capacitors are used to block said DC electric power from entering the input and output of said forward amplifier and said backward amplifier.

4. A bi-directional repeater for transmission line based electric fences as in claim 1, wherein one low-pass filter is inserted in each transmission line metal wire to block short electric pulse from going through while allowing DC electric power to go through to power repeater(s) further down said transmission line.

5. A bi-directional repeater for transmission line based electric fences as in claim 1, wherein a section of transmission line immediately after said repeater is hidden in the supporting post so that dead zone along said transmission line based electric fence is eliminated.

* * * * *